(No Model.)
N. O. BOND.
COFFEE POT.
No. 529,238. Patented Nov. 13, 1894.
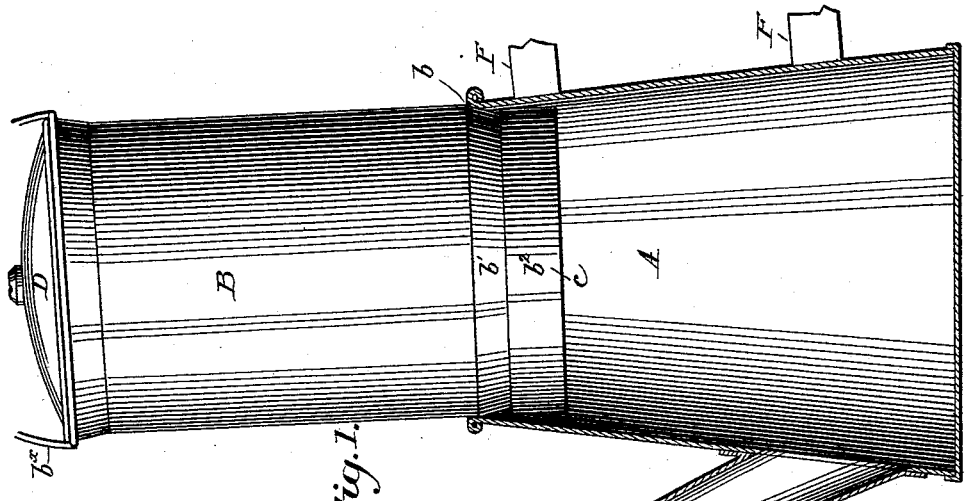
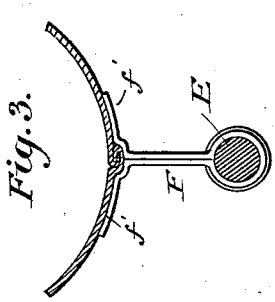
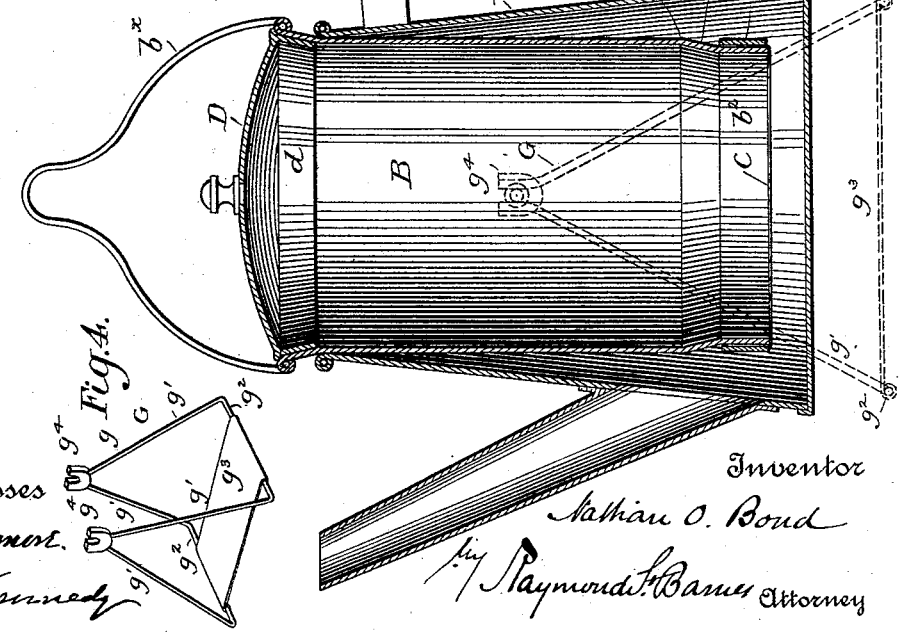

UNITED STATES PATENT OFFICE.

NATHAN O. BOND, OF FAIRFAX COURT-HOUSE, VIRGINIA.

COFFEE-POT.

SPECIFICATION forming part of Letters Patent No. 529,238, dated November 13, 1894.

Application filed August 29, 1894. Serial No. 521,623. (No model.)

*To all whom it may concern:*

Be it known that I, NATHAN O. BOND, of Fairfax Court-House, county of Fairfax, and State of Virginia, have invented a new and useful Improvement in Coffee-Pots, of which the following is a specification.

My invention relates to coffee pots of that kind known as drip coffee pots, in which the ground coffee is held in a receiver provided with a strainer at its bottom and sustained at the upper end of the pot. In the use of coffee pots of this kind the ground coffee is placed in the receiver upon the strainer, and boiling water poured upon it, which passing through the coffee extracts the strength therefrom and falls through the strainer into the pot below. It is found in practice, that pouring through twice produces that strength and flavor preferred by most coffee drinkers, but that the total strength of the coffee is not extracted and that from the residue, a strong and bitter coffee may be made by a second process of boiling the coffee in the pot proper. This second coffee will in most cases be as satisfactory to the domestics of a family as drip coffee and sometimes preferred.

My invention has for its objects the construction of a simple and efficient device by means of which both the drip coffee and the second form of coffee mentioned may be made, also a coffee made in the old way, for those who are prejudiced against drip coffee, as will be further described.

With these objects in view, the invention consists in the details of construction and the combination of parts set forth in the following description reference being had to the drawings accompanying the same, in which—

Figure 1— is a sectional elevation of my coffee pot with the receiver at its raised or upper position. Fig. 2— is a similar view with the receiver at its lowest position. Fig. 3— is a detail view of the method of securing the handle. Fig. 4— is a perspective view of a supporting base.

Referring to the drawings A is the pot proper of the ordinary cylindrical shape having tapered sides and smaller at the top than at the bottom. This pot is provided with the usual spout or nozzle and at its opposite side with a handle E, the construction of which will be further described hereinafter. Mounted within the pot is a cylinder B, of such diameter as to closely fit its upper end. At its lower end the cylinder B is reduced in diameter in such a manner as to form a shoulder $b$, and an inwardly inclined surface $b'$, extending therefrom and connecting with a cylindrical ring $b^2$ of smaller diameter than cylinder B. Over this ring $b^2$ a strainer C is fitted, preferably of cloth or finely reticulated gauze and secured upon the ring $b^2$ by a ring $c$ of substantially the same width as the ring $b^2$ and of a diameter to fit closely thereover. The shoulder $b$ is adapted to act as a locking device to sustain the cylinder in its highest position, as is shown in Fig. 1, of the drawings, in the manner which will be further described.

The upper end of the cylinder B is slightly flared, in order to receive a cover D, having a depending inclined flange $d$. This construction is adopted in order that the same cover may fit both the cylinder B, and the pot A when the cylinder is removed therefrom. In order to properly manipulate the cylinder B and to remove the same when not in use, it is provided at its upper end with a handle $b^\times$ secured to its rim in such position as not to interfere with the free removal of the cover D. The handle E previously referred to is formed of a cylindrical bar of wood or other non-heat conducting material and is provided with shoulders $e$ $e$ at its upper and lower ends between which shoulders are mounted brackets F formed of strips of metal bent around the handle and secured together by solder or by riveting the ends $f'$ $f'$ of said brackets being spread apart and shown in detail in Fig. 3, in such manner as to straddle or embrace the same upon the coffee pot, upon which they are secured by riveting or soldering. I find that this construction makes a very strong and durable handle and that objectionable heat is avoided at the point where the hand takes hold of the coffee pot in using the same.

It will be noted by reference to the drawings that the length of the cylinder B is such that when at its lowest position, its lower end is in close proximity to the bottom of the pot A, and that its size is such as to nearly fill the interior of the pot. These points of construction are adopted for reasons which will presently be described.

Where pots of large size are required as in hotels and similar places, I purpose to mount the same as shown in dotted lines in Fig. 2, and in detail in Fig. 4, the pot being provided on each each side with trunnions resting in bearings in a bracket G, formed as follows: Each side of the bracket G consists of a wire or rod $g$ bent in substantially U-shape, to form two uprights $g'$ $g'$ and a foot or base $g^2$. The two brackets are secured together by a base plate $g^3$, preferably of sheet metal bent over the feet $g^2$, and soldered thereto. At their upper ends the brackets are secured preferably by soldering in such manner as to form bearings $g^4$, such as are shown in the drawings. This operation is preferably performed in a mold so shaped as to form the material into bearings around the ends of the rods, which are introduced therein.

I have discovered that by making the cylinder of such length that the lowest end of the same will be in close proximity to the bottom of the pot, the mass of ground coffee contained therein, will be subjected to an agitation due to their air bubbles rising from the bottom of the coffee pot, during the process of making the coffee, which agitation will insure the equal moistening of the mass of ground coffee and a consequent extraction of its full strength. In using this device therefore the cylinder is first lifted to its upper position where it is secured, the coffee placed in the receptacle and boiling water poured into the cylinder, which percolating through the coffee and strainer and falling into the pot below forms drip coffee in the well known manner. This operation is preferably repeated in order to insure the required strength and flavor. The coffee thus made is then ready to be used or removed to a separate receptacle for use. When this coffee is removed, the second form of coffee may be made from the grounds remaining in the receptacle by pushing the receptacle down to its lowest limit and pouring boiling water upon the grounds and subjecting the same to the action of heat for ten or fifteen minutes. During this operation the proximity of the screen and the ground coffee lying thereon to the bottom of the coffee pot, is such that the action of the air bubbles rising from the bottom of the pot insures the agitation and extraction of the full strength of the coffee.

It will thus be seen that my device is calculated to produce two kinds of coffee from one and the same charge of ground material and in connection with the movement of the cylinder up and down, it will be noted that the cylinder $b'$ acts as a locking device in connection with the upper edge of the pot A, by means of which the cylinder is sustained in its upper position. This locking action is secured by tilting the cylinder B in relation to the pot A and when tilted the shoulder locks against one side of the pot A. In this position it is impossible to move the cylinder up or down without previously returning it to an upright position.

Having thus described my invention, what I claim, and desire to secure by Letters Patent, is—

1. In a coffee pot of the kind described the combination of a pot and a cylinder adapted to slide therein, said cylinder having a shoulder adapted to lock upon the upper edge of the pot when the cylinder is raised and tilted, substantially as described.

2. In a coffee pot of the kind described, the combination of the pot proper, a cylinder adapted to slide in the top thereof, a handle whereby the cylinder may be moved, a reduced section at the lower end of the cylinder whereby a shoulder is formed upon the cylinder, a ring fitting upon such reduced section, a screen secured by said ring, said shoulder forming a lock when the cylinder is raised and tilted as described.

3. The combination with a coffee pot provided with trunnions, of a stand upon which said trunnions revolve, said stand being composed of two U-shaped sections of wire, the center sections of which are joined by a strip of sheet metal the upper ends of the U-shaped sections being soldered together to form bearings for the trunnions as and for the purpose as described.

In testimony whereof I hereunto set my hand.

NATHAN O. BOND.

Witnesses:
C. A. NEALE,
RAYMOND F. BARNES.